United States Patent
Osmer et al.

(10) Patent No.: US 6,394,490 B2
(45) Date of Patent: *May 28, 2002

(54) VEHICLE OCCUPANT POSITION DETECTOR AND AIRBAG CONTROL SYSTEM

(75) Inventors: William Osmer, Granger, IN (US); Michael R. Wills, Richmond, MI (US); Patrick B. Blakesley, Goshen, IN (US)

(73) Assignee: CTS Corporation, Elkhart, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/814,904

(22) Filed: Mar. 22, 2001

Related U.S. Application Data

(63) Continuation of application No. 09/374,870, filed on Aug. 16, 1999, now Pat. No. 6,250,671.

(51) Int. Cl.[7] ............................. B60R 21/32; B60D 1/28

(52) U.S. Cl. ........................................ 280/735; 180/271

(58) Field of Search ........................ 280/735; 180/271; 701/45

(56) References Cited

U.S. PATENT DOCUMENTS

| | | | | |
|---|---|---|---|---|
| 5,531,472 A | * | 7/1996 | Semchena et al. | 280/735 |
| 5,573,269 A | * | 11/1996 | Gentry et al. | 280/735 |
| 5,732,375 A | * | 3/1998 | Cashler | 701/45 |
| 5,739,757 A | * | 4/1998 | Gioutsos | 280/735 |
| 5,971,432 A | * | 10/1999 | Gagnon et al. | 280/735 |
| 6,039,344 A | * | 3/2000 | Mehney et al. | 280/735 |
| 6,070,115 A | * | 5/2000 | Oestreicher et al. | 701/45 |

* cited by examiner

Primary Examiner—Brian L. Johnson
Assistant Examiner—Jacqueline Sliteris
(74) Attorney, Agent, or Firm—Mark P. Bourgeois; Mark W. Borgman

(57) ABSTRACT

An automobile seat occupant sensor and airbag control system for detecting the location and weight of a person in a car and a seat inclination angle. The system includes an airbag and an airbag deployment mechanism for deploying the airbag. Several sensors are fixedly located in a weight path of the vehicle seat. The sensors are located between a seat bottom and a vehicle floor. A controller is connected between the airbag deployment mechanism and the sensors for controlling deployment of the airbag. The controller calculates a center of gravity of the seat occupant, weight of the occupant and a seat inclination angle and uses this information to control deployment of the airbag.

5 Claims, 5 Drawing Sheets

VEHICLE OCCUPANT POSITION DETECTOR AND AIRBAG CONTROL SYSTEM

This is a continuation of application Ser. No. 09/374,870, filed Aug. 16, 1999, now U.S. Pat. No. 6,250,671.

BACKGROUND OF THE INVENTION

1. Field of the Invention

This invention relates to an automobile seat occupant sensor and airbag control for detecting the location and weight of a person in car seat, and in particular to a sensor that can detect the presence and location of an occupant using strain sensitive resistors and provide an electrical signal to control activation of an airbag.

2. Description of the Related Art

Various devices are well known for their ability to measure force, pressure, acceleration, temperature, position, etc. by using a sensing structure combined with signal processing electronics. One general type of sensor or transducer for such applications is a resistive strain gauge sensor in which force or pressure is sensed or measured based on strain placed on the resistors. Resistive strain gauges function by generating changes in resistance proportional to force which causes dimensional changes of the resistor.

Many types of strain gauge sensors have been designed and made commercially available. Various strain gauge sensors have proven to be generally satisfactory. Prior art sensors; however, have tended to be rather expensive and not suitable in certain applications such as sensing the presence of an occupant in an automobile seat. A sensor suitable for such an application must be compact, robust, impervious to shock and vibration and yet inexpensive.

Automobile seats can use sensors to activate air bags, which would be deployed during an accident. Injury to infants or small children from air bag deployment with excessive force is a current industry problem. A weight sensor in the seat can be used to control the deployment force during air bag activation. If a heavy person is in the seat, the airbag is deployed at full force. If a light person is in the seat, such as a child, the airbag is deployed at a slower, less forceful rate.

Another problem with airbag deployment is determining the position and posture of a person in a vehicle seat. If the seat occupant is located in the front of the seat, it is desired to activate the air bag with less force. If the seat occupant is located in the rear of the seat, it is desired to activate the air bag with more force. Similarly, if the seat back is an automobile seat is reclined, it may be desired to control the activation of the airbag based upon the seat back angle. For example, if the seat back is reclined fully, it may be desired to activate the air bag with more force. If the seat back is in an upright position, it may be desired to activate the airbag with less force.

U.S. Pat. No. 5,573,269 discloses a system that uses multiple sensors. Several weight sensors are placed in the seat, the floor and a seat angle sensor is attached to the seat back. This system has many disadvantages. It is expensive to produce and install all the sensors. The weight sensor in the seat is attached to the springs which can give inaccurate readings of weight depending on the placement of the sensors in the seat.

Other seat occupant detection systems have been devised based upon ultrasonic sensing technologies. The occupants distance from the dashboard is measured by a sensor. Other sensors try to measure the size of the occupant. Unfortunately, the ultrasonic systems produce frequent errors in calculating the size of the occupant as they have difficulty in interpreting an occupant shifting in the seat, moving the seat forward or backward and reclining the seat.

A current unmet need exists for a reliable, low cost, simple and robust automobile seat weight sensor and system that is used to control airbag deployment. A current unmet need also exists for an air bag control system that can monitor occupant weight, seat position and seat back angle with a minimum number of sensors at a low cost.

3. Related Art

Examples of patents that are related to the present invention are as follows, and each patent is herein incorporated by reference for the supporting teachings:

U.S. Pat. No. 5,573,269 is a apparatus for sensing and restraining an occupant of a vehicle seat.

U.S. Pat. No. 4,556,598 is a porcelain tape for producing porcelainized metal substrates.

U.S. Pat. No. 5,232,243 is an occupant sensing apparatus.

U.S. Pat. No. 5,276,432 is a patient exit detection mechanism for hospital bed.

U.S. Pat. No. 5,739,757 is an vehicle passenger weight sensor.

The foregoing patents reflect the state of the art of which the applicant is aware and are tendered with the view toward discharging the applicant's acknowledged duty of candor in disclosing information which may be pertinent in the examination of this application. It is respectfully stipulated, however, that none of these patents teach or render obvious, singly or when considered in combination, the applicant's claimed invention.

SUMMARY OF THE INVENTION

It is a feature of the invention to provide a reliable and cost-effective automobile seat occupant sensor and airbag control system for detecting the location and weight of a person in car seat, and in particular to a sensor that can detect the presence and location of an occupant using strain sensitive resistors and provide an electrical signal to control activation of an airbag.

An additional feature of the invention is to provide a vehicle airbag control system for sensing the weight and position of an occupant in a vehicle seat and controlling an airbag, the system includes an airbag and an airbag deployment means for deploying the airbag. Several sensors are fixedly located in a weight path of the vehicle seat. The sensors are located between a seat bottom and a vehicle floor. The sensors are located substantially near an outer perimeter of the seat, each sensor provides an electrical output signal representative of the weight applied by the vehicle occupant at the sensor location. A controller means is connected between the airbag deployment means and the sensors for controlling deployment of the airbag in response to the electrical output signals. The controller means calculates a center of gravity of the seat occupant to locate the position of the occupant in the seat and determines if the occupant is in a first position where the airbag is allowed to deploy or is in a second position where the airbag is prevented from deploying.

Another feature of the invention is to provide a control system for controlling an airbag. The control system controls the airbag in relation to the weight and position of a seat occupant. The system includes an airbag and an airbag inflation means that are connected to the air bag to inflate the airbag. A sensor means is attached to a seat, for sensing a weight of the seat occupant at a sensor location. A processor is connected to the sensors and to the airbag inflation means. A software means operates on the processor to calculate the weight of the seat occupant and determine if the weight of the seat occupant is less than a first magnitude. The software means also prevents actuation of the airbag inflation means, if the weight of the seat occupant is less than a first magnitude and allows actuation of the airbag inflation means, if the weight of the seat occupant is greater than the first magnitude. The software means further can calculate a center of gravity of the seat occupant and determine if the center of gravity is inside or outside a first area. This information is used to prevent actuation of the airbag inflation means, if the center of gravity is outside the first area; and allow actuation of the airbag inflation means, if the center of gravity is inside the first area. The software means can further be used to calculate a seat inclination angle of the seat. This information is used to determine if the seat inclination angle is greater than or less than a first magnitude. The airbag inflation means is prevented from actuating, if the seat inclination angle is less than the first magnitude and allowed to actuate if the seat angle is greater than the first magnitude.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims, or may be learned by the practice of the invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
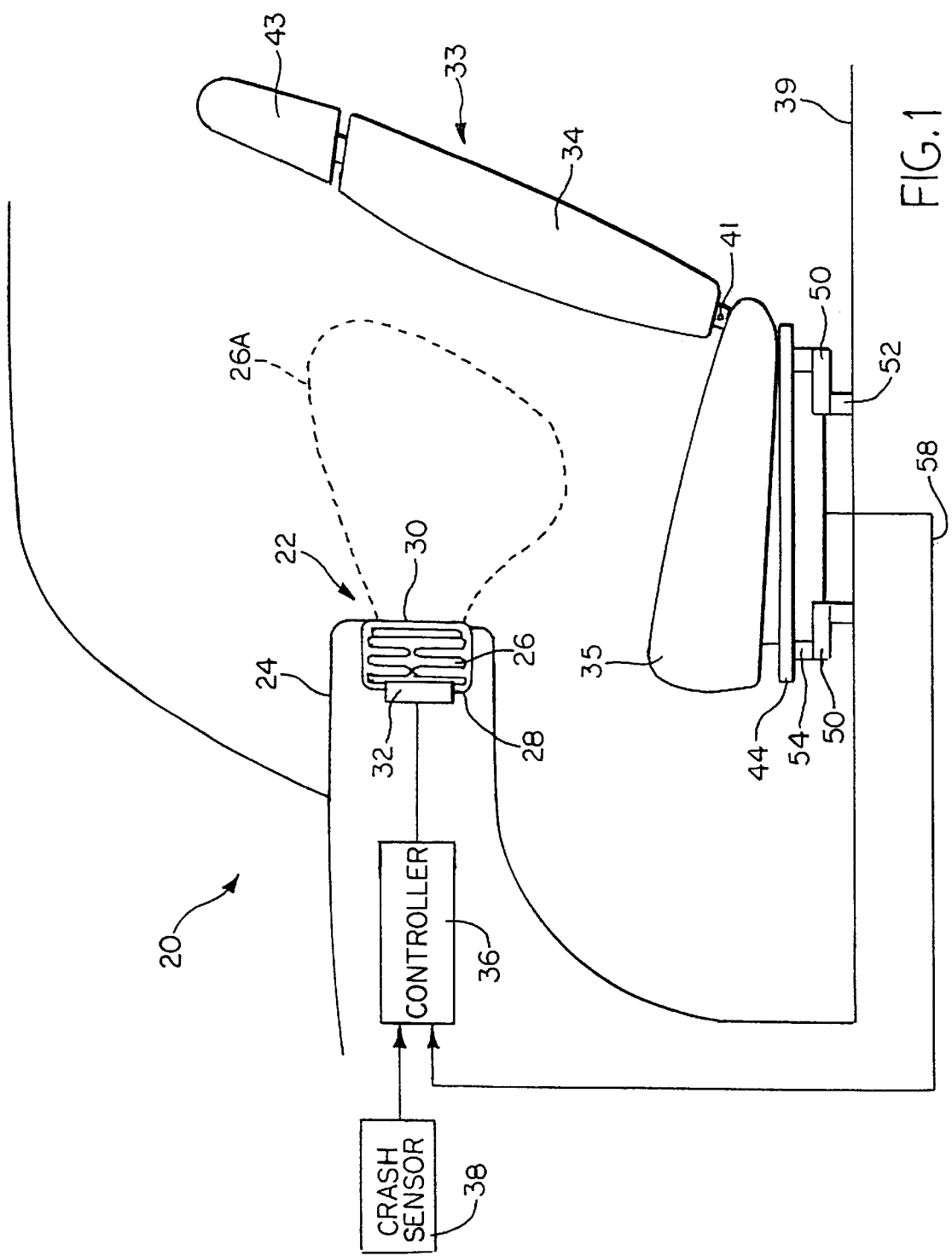
FIG. 1 is a diagrammatic view of an air bag control system.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. In the drawings like numbering represents like elements between the drawings.

DETAILED DESCRIPTION OF THE PREFERRED EMBODIMENT

Figure 2:
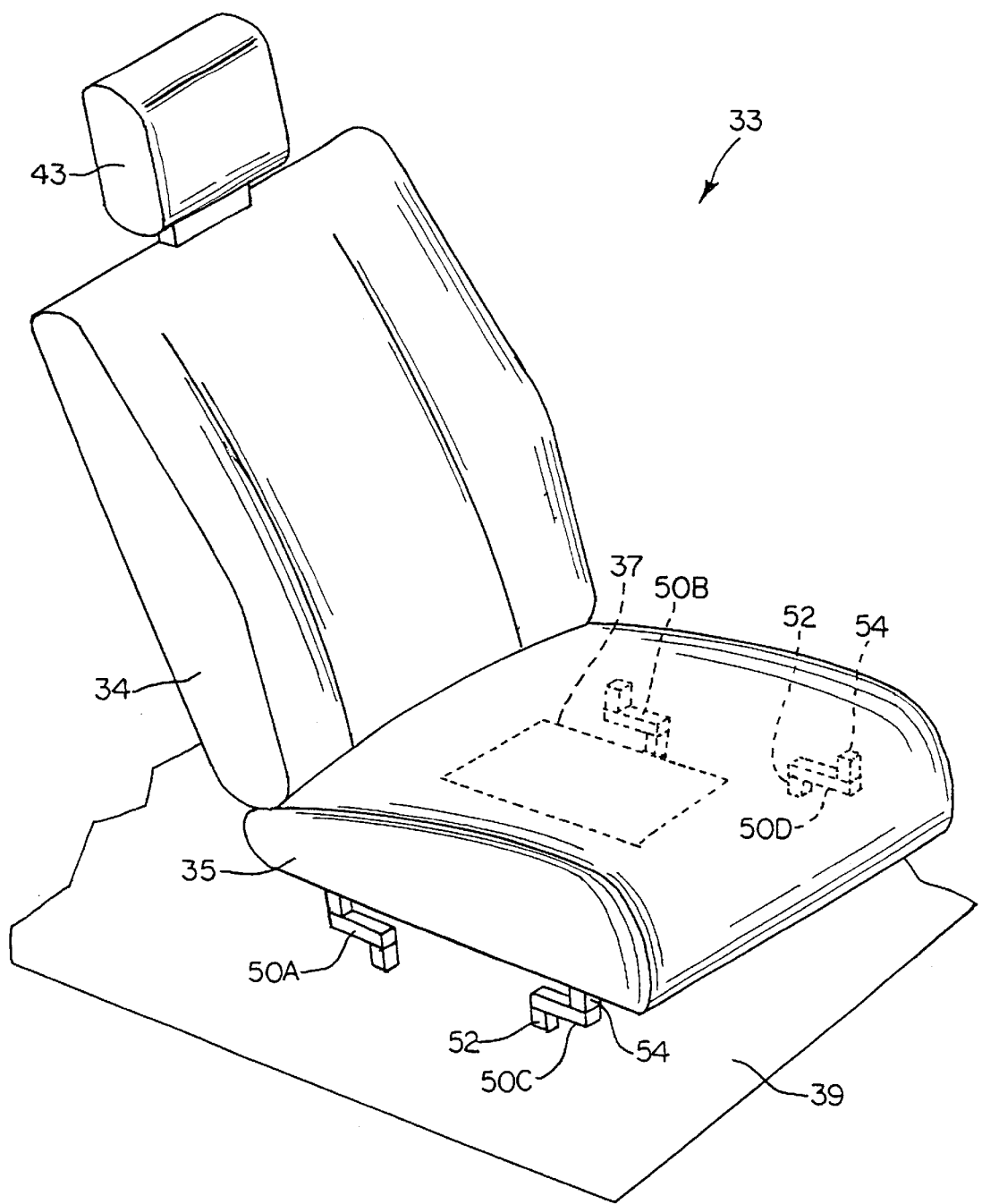
FIG. 2 is a perspective view of the automobile seat of FIG. 1.
Figure 3:
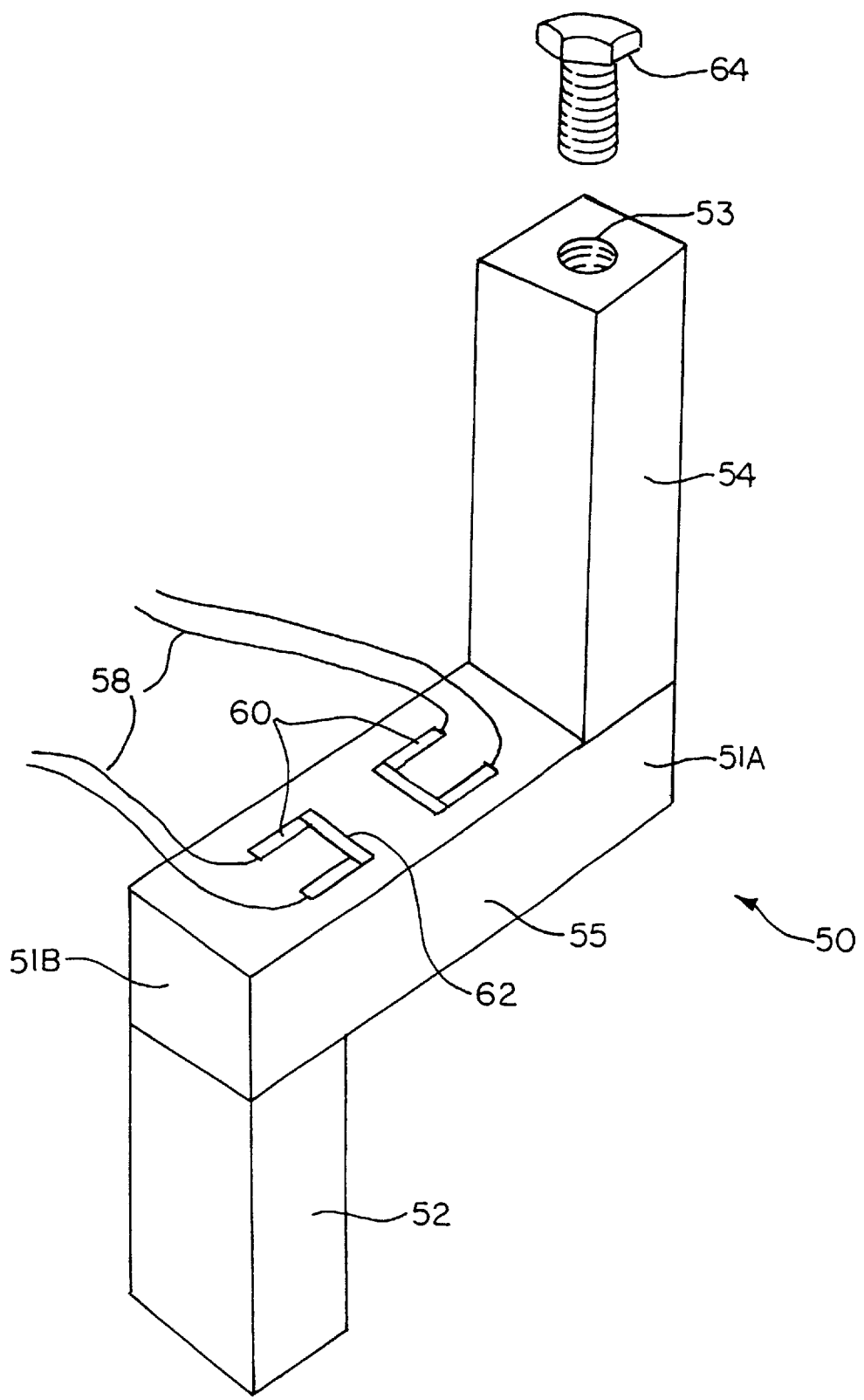
FIG. 3 is a perspective view of the automobile seat weight sensor of FIG. 1.

Referring to FIGS. 1, 2 and 3 there is a Vehicle Occupant Position Detector and Airbag Control System 20 shown. System 20 has an airbag assembly 22 mounted on part of a steering wheel or dashboard 24 of a vehicle. Assembly 22 has an airbag 26 folded within a housing 28. A cover 30 covers the airbag. An inert gas source 32, typically generated by a combustion reaction is mounted to the rear of housing 28. Gas source 32 fills airbag 26 upon deployment to a filled or inflated position 26A. Airbag 26 cushions an occupant in seat 33 in case of a collision or crash. An airbag controller 36, usually incorporating a microcontroller and software operating on the microcontroller, is connected to a conventional crash sensor 38. Crash sensor 38 typically is an inertia switch or an accelerometer. In a crash, the crash sensor 38 sends a signal indicating a crash is taking place. The controller 36 then actuates the gas source 32 which fills airbag 26.

The occupant seat 33 can be a driver seat, passenger seat or rear seats in an automobile or other seats in a bus or truck. Seat 33 has a seat back 34, seat bottom 35, and head rest 43. A seat pivot pin 41 allows seat back 34 to be adjusted to tilt at a chosen seat back angle by the occupant. A conventional seat rail 44 is attached to seat bottom 35 and allows seat 33 to be moved toward and away from dashboard 24. Connected between seat rail 44 and vehicle floor 39 are four weight sensors 50A, 50B, 50C and 50D. Sensors 50 A,B,C and D are placed toward the outer perimeter of the seats. Weight sensors 50 measure the weight that the seat occupant places at the four corners of the seat. Sensors 50 have a cantilevered beam or base 55 upon which several strain gage resistors 60 are placed that are interconnected by conductors 62. A dielectric (not shown) covers the surface of beam or base 55. The resistors 60 may be arranged on the top, sides or bottom of sensor 50. Attached to resistors 60 are wires 58. Wires 58 are connected to controller 36. Resistors 60 are arranged in a bridge circuit (not shown) that is well known in the art. The base 55 is made of steel. Resistors 60 and conductors 62 are formed from conventional thick film materials. Upper support posts 54 connect between an end 51A of sensor 50 and seat rail 44. Lower support posts 52 connect between an end 51B of sensor 50 and floor 39. Posts 52 and 54 are formed from steel. Posts 52 and 54 may be welded to sensor 50 or attached using conventional fasteners. Posts 52 and 54 connect seat 33 to floor 39 and allow the full seat weight to be applied as a bending moment or strain through sensor 50. Upper post 54 and lower posts 52 have apertures 53 into which bolts 64 are fastened to attach the posts to the floor 39 and seat rail 44. If desired posts 52 and 54 could be welded to floor 39 and seat rail 44. When an occupant sits on seat bottom 35, the occupants weight causes the strain or bending force in sensor 50 to increase. A voltage is applied through wires 58 to resistors 60. The force is measured by resistors 60 as an electrical signal that changes with the occupants weight and is transmitted over a wire harness 58 to air bag controller 36. The voltage level of each resistor can be correlated to a specific weight at each sensor location.

Figure 4:
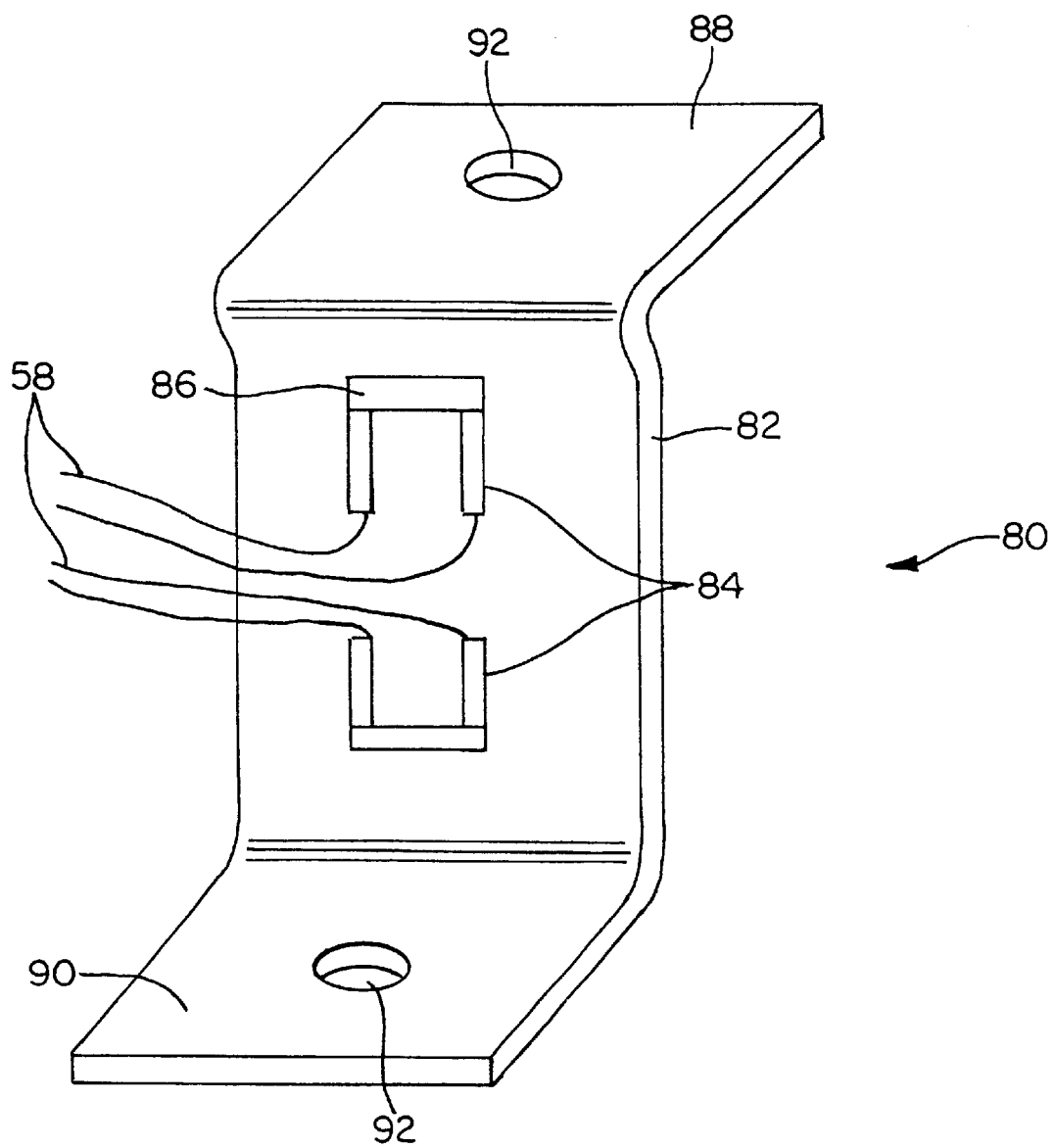
FIG. 4 is a perspective view of an alternative embodiment of the automobile seat weight sensor of FIG. 1.

Referring to FIG. 4, an alternative embodiment of sensor 50 is shown. In FIG. 4, a sensor 80 is shown. Sensor 80 has a base 82 upon which several strain gage resistors 84 are placed that are interconnected by conductors 86. A dielectric (not shown) covers the surface of base 82. The resistors 84 may be arranged on the either side of base 82. Attached to resistors 84 are wires 58. Wires 58 are connected to controller 36. Resistors 84 are arranged in a bridge circuit (not shown) that is well known in the art. The base 82 is made of steel. Resistors 84 and conductors 86 are formed from conventional thick film materials. Base 82 has an upper plate 88 and a lower plate 90 attached. Upper plate 88 connects sensor 80 to seat rail 44 using fasteners (not shown) through aperture 92. Similarly, lower plate 90 connects between sensor 80 and floor 39 using fasteners (not shown) through aperture 92. Plates 88 and 90 allow the full seat weight to be applied as a bending moment or strain through sensor 80. If desired, plates 88 and 90 could be welded to floor 39 and seat rail 44. The operation of sensor 80 is the same as that for sensor 50.

The air bag controller 36 controls deployment of airbag 22 based upon the occupants weight, position and the crash sensor signal. The occupants total weight can be calculated by summing the weights at the four individual sensors. The occupants position is determined by calculating the center of gravity of the seat occupant. The center of gravity is calculated by controller 36. Calculating the center of gravity using four load cells is disclosed in U.S. Pat. No. 5,276,432 and is specifically incorporated by reference. In particular, the center of gravity (Cg) is determined with respect to a set of Cartesian coordinates x and y that correspond to the area occupied by the seat. The center of gravity has coordinates of Xcg and Yxg and is calculated by the following equations:

$$Xcg = \sum_{i=0}^{4}(M(i) \cdot X(i)/TM)$$

$$Ycg = \sum_{i=0}^{4}(M(i) \cdot Y(i)/TM)$$

$$TM = \sum_{i=0}^{4}(M(i))$$

Where X(i) is the X coordinate for sensors 50, A, B, C and D. Y(i) is the Y coordinate for sensors 50, A, B, C and D. M(i) is the weight at each sensor location and TM is the total weight. Controller 36 uses the location of the center of gravity (Xcg, Ycg) to determine the occupants location in seat 33. If the occupant's center of gravity is within a zone 37 of seat bottom 35, the air bag is deployed with full force. If the center of gravity is outside of zone 37, the air bag is deployed at reduced force or prevented from deployment.

If the occupant's total weight is above a minimum weight, the air bag is deployed with full force. If the weight is below the minimum weight, the air bag is deployed at reduced force or prevented from deployment.

The seat inclination angle is calculated by controller 36 using the weight values from the four sensors 50A, 50B, 50C and 50D. The weight values from the back two sensors 50A and 50B are summed into a variable Y. The weight values from the front two sensors 50C and 50D are summed into a variable X. The ratio X/Y is compared to a chart stored in a memory in controller 36 that contains measured X/Y ratios for various seat inclination angles. For example, when the occupant is upright and seated in the middle of the seat, x and y are equal and x/y=1. As the occupant reclines in the seat, the ratio of x/y will decrease as more weight is placed on sensors 50A and 50B and less weight is placed on sensors 50C and 50D. Eventually, when the seat is reclined enough, the force on the front sensors 50C and 50D will change from a downwardly exerting force to an upwardly exerting force or negative force. At this point x/y=0. This value will be reached at a seat angle of approximately 45 degrees from vertical. As the seat continues to recline further, the ratio of x/y will be less than zero as the front sensors 50C and 50D continue to measure and upwardly acting force or negative weight. When the occupant is seated upright, ie. x/y=1, the airbag may be deployed with less force or prevented from deploying. As the occupant reclines and x/y is between 0 and 1, the air bag force is increased. When x/y is less than 0, the airbag is deployed with full force.

Figure 5:
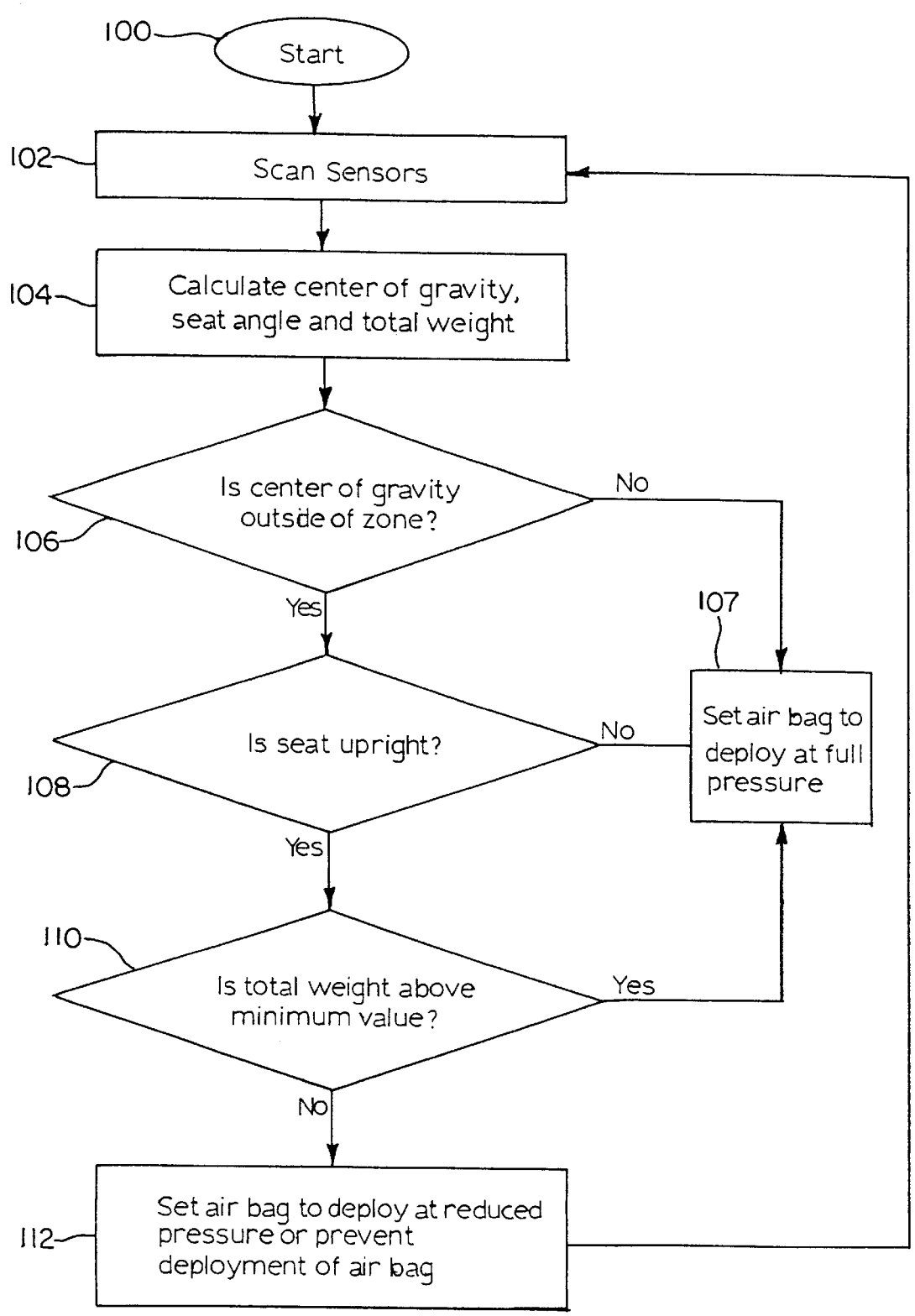
FIG. 5 is a flow chart of a control routine for the air bag control system.

Referring to FIG. 5, a flow chart of a control routine for the air bag control system 20 is shown. At step 100 the routine is started. At step 102, sensors 50 A, B, C and D are scanned. At step 104, the controller uses the sensor data to calculate a center of gravity, total weight and seat angle. At step 106, the center of gravity is compared to determine if it is outside of zone 37. If it is inside of zone 37, a no is returned and the air bag is set to deploy at full pressure at step 107. If it is outside of zone 37, a yes is returned and the routine goes to step 108. At step 108, the seat angle is compared to determine if the seat is upright or reclined. If it is reclined beyond a certain angle, a no is returned and the air bag is set to deploy at full pressure at step 108. If it is upright or less than a certain angle, a yes is returned and the routine goes to step 110. At step 110, the total weight is compared to determine if it is above a minimum value. If it is above a minimum value, a yes is returned and the air bag is set to deploy at full pressure at step 107. If it is below a minimum value, a no is returned and the air bag is set to deploy at reduced pressure or prevented from deploying at all at step 112.

The airbag control system 20 is able to change the force with which the airbag is deployed depending upon the occupants weight, seat position, and how far the seat back is reclining. These three control parameters are calculated from four resistive strain gage weight sensors located toward the perimeter of the vehicle seat.

VARIATIONS OF THE PREFERRED EMBODIMENT

Although the illustrated embodiment depicts using the airbag control system to control as dashboard or steering wheel mounted airbag, one skilled in the art will realize that the preferred embodiment would work with other airbags such as side mounted or rear seat airbags or head protection air bags.

Furthermore, the shape of sensor 50 could be varied to any configuration that would transfer the weight from the car seat to the floor and allow the strain sensitive resistors to be mounted. For example sensor 50 could be Z-shaped or C-shaped or S-shaped.

Although thick film resistors 60 were shown mounted on base 55, another variation of the weight sensor 50 would be to use individual chip resistors mounted on base 55 or polymer resistors or metal foil strain gauges.

Yet, a further variation, is to integrate sensor 50 into seat rail 44.

Although the illustrated embodiment depicts using the airbag control system to control airbags at two inflation rates. Other rates of inflation could be controlled such as variable inflation rates or multiple inflators.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle airbag control system for sensing the weight and position of an occupant in a vehicle seat and controlling an airbag, comprising:
   a) an airbag;
   b) airbag deployment means for deploying the airbag;
   c) a plurality of sensors, fixedly located in a weight path of the vehicle seat, the sensors located between a seat bottom and a vehicle floor, the sensors further located substantially near an outer perimeter of the seat, each sensor providing an electrical output signal representative of the weight applied by the vehicle occupant at the sensor location, the sensors having strain gauge resistors mounted to a cantilevered beam;
   (d) a seat zone located within the outer perimeter of the seat, the seat zone defined as a region of the seat which when the occupant is positioned within the airbag can be safely deployed; and
   (e) controller means, connected between the airbag deployment means and the sensors for controlling deployment of the airbag in response to the electrical output signals, the controller means calculating a center of gravity of the seat occupant to locate the position of the occupant in the seat and determining if the center of gravity of the occupant is in a first position located inside the seat zone where the airbag is allowed to deploy or is in a second position located outside the seat zone where the airbag is prevented from deploying, the controller means further calculating a weight of the seat occupant and allowing deployment of the airbag if the occupants weight is above a first magnitude and preventing deployment of the airbag if the occupants weight is below the first magnitude.

2. A method for controlling deployment of an air bag, comprising:
   a) providing a plurality of seat weight sensors attached between a vehicle seat and a vehicle floor, the sensors located substantially at an outer perimeter of the seat, each sensor having a plurality of strain gage resistors mounted to a cantilevered beam between the seat and a vehicle floor;
   b) providing an airbag controller;
   c) seating an occupant into the seat;
   d) generating a plurality of electrical signals from the seat weight sensors proportional to the weight and location of the seat occupant;
   e) providing the electrical signal to an airbag controller that is connected to the airbag;
   f) calculating a center of gravity and weight of the seat occupant from the electrical signals to locate the position of the occupant in the seat;
   g) determining if the center of gravity of the occupant is in a first position within the outer perimeter of the seat where the airbag is allowed to deploy or is in a second position outside the outer perimeter of the seat where the airbag is prevented from deploying; and
   h) determining if the occupant weight is above a first magnitude where the airbag is allowed to deploy or is below the first magnitude where the airbag is prevented from deploying.

3. The method for controlling deployment of an air bag according to claim 2 wherein, the airbag is deployed with maximum force, if a heavy occupant is detected in the seat and the airbag is deployed at less than maximum force, if a light occupant is detected in the seat.

4. The method for controlling deployment of an air bag according to claim 2, further comprising:
   determining if the center of gravity is located outside the vehicle seat.

5. A control system for controlling an airbag, the control system controlling the airbag in relation to the weight and position of a seat occupant, comprising:
   a) an airbag;
   b) an airbag inflator, connected to the air bag, for inflating an airbag;
   c) a sensor, attached to a seat, for sensing a weight of the seat occupant at a sensor location, the sensor located substantially near an outer perimeter of the seat and providing an electrical output signal representative of the weight applied by the vehicle occupant at the sensor location, the sensor including a plurality of strain gauge resistors mounted to a vertically oriented base;
   d) a processor connected to the sensors and to the airbag inflation means;
   e) software operative on the processor for:
      e1) calculating the weight of the seat occupant;
      e2) determining if the weight of the seat occupant is less than a first magnitude;
      e3) preventing actuation of the airbag inflation means, if the weight of the seat occupant is less than a first magnitude; and
      e4) allowing actuation of the airbag inflation means, if the weight of the seat occupant is greater than the first magnitude;
   f) calculating a center of gravity of the seat occupant;
   g) determining if the center of gravity is inside or outside a first area, the first area defined as being substantially within the outer perimeter of the seat;
   h) preventing actuation of the airbag inflation means, if the center of gravity is outside the first area; and
   i) allowing actuation of the airbag inflation means, if the center of gravity is inside the first area.

* * * * *